United States Patent [19]
Imamura

[11] Patent Number: 5,687,612
[45] Date of Patent: Nov. 18, 1997

[54] POWER TRANSMITTING APPARATUS FOR VEHICLE

[75] Inventor: Masahiro Imamura, Saitama-ken, Japan

[73] Assignee: Honda Giken Kogyo Kabushiki Kaisha, Tokyo, Japan

[21] Appl. No.: 604,660

[22] Filed: Feb. 21, 1996

[30] Foreign Application Priority Data

Feb. 24, 1995 [JP] Japan .................................. 7-036915

[51] Int. Cl.$^6$ .................................................. B60K 17/04
[52] U.S. Cl. .......................... 74/421 A; 475/200; 464/16
[58] Field of Search ........................ 74/421 A; 475/200, 475/206; 464/16, 157, 158, 182; 403/37, 298, 359

[56] References Cited

U.S. PATENT DOCUMENTS

| | | | |
|---|---|---|---|
| 2,036,389 | 4/1936 | Bannan | 74/421 A |
| 3,434,366 | 3/1969 | Raso et al. | 74/421 A |
| 4,108,021 | 8/1978 | MacAfee et al. | 475/206 X |
| 4,771,864 | 9/1988 | Lorimor et al. | 464/16 |
| 5,295,413 | 3/1994 | Sherman | 74/606 R |

FOREIGN PATENT DOCUMENTS

| | | |
|---|---|---|
| 55-22529 | 2/1980 | Japan . |
| 57-181628 | 11/1982 | Japan . |

*Primary Examiner*—Richard M. Lorence
*Attorney, Agent, or Firm*—Nikaido, Marmelstein, Murray & Oram LLP

[57] ABSTRACT

A power transmitting apparatus for use in a transportation vehicle includes a motor shaft of a vehicle-driving motor, an input shaft operatively connecting with the motor shaft, output shafts provided in parallel with the input shaft to be connected with driven wheels of the vehicle, and a transmitting mechanism for transmitting driving power from the input shaft to the output shafts. The opposite end portions of the motor shaft are supported by a pair of motor shaft bearings, and one of the motor shaft end portions supports one of the opposite end portions of the input shaft in such a manner that the motor shaft can transmit driving power from the vehicle-driving motor to the input shaft. The other end portion of the input shaft is supported by another bearing, and the transmitting gearing is disposed adjacent to the other end portion of the input shaft remotely from the section where the one end portion of the input shaft is supported. This arrangement can make unnecessary one separate bearing to support the one end portion of the input shaft of the speed-reducing mechanism, and hence reduce the number of the necessary bearings. The arrangement can also substantially reduce the axial length of the housing necessary for receiving and retaining the bearings. Consequently, the size and weight of the power transmitting apparatus can be reduced.

5 Claims, 8 Drawing Sheets

POWER TRANSMITTING APPARATUS FOR VEHICLE

BACKGROUND OF THE INVENTION

1. Field of the Invention

The present invention relates to a power transmitting apparatus for use in a transportation vehicle to transmit driving force or power from a vehicle driving motor to a speed-reducing mechanism.

2. Description of the Related Art

Driving power transmitting apparatuses for transmitting driving power from a vehicle driving motor to a speed-reducing mechanism are disclosed in, for example, Japanese Utility Model Laid-Open Publication No. SHO 57-181628 for "Power Transmitting Apparatus for Battery-Powered Forklift" and Japanese Utility Model Laid-Open Publication No. SHO 55-22529 for "Driving Apparatus for Industrial Electromotive Vehicle".

The power transmitting apparatus disclosed in the SHO 57-181628 publication is generally shown in FIG. 7, wherein a main shaft 102 of a driving motor 100 (i.e., motor shaft) has opposite ends supported via a pair of bearings (not shown), and a transmission driving shaft 104 (i.e., input shaft) coupled to the main shaft 102 also has opposite ends supported via a pair of bearings. In the disclosed power transmitting apparatus, driven gear 108 is rotated by a drive gear 106 mounted on the driving shaft 104, and a driven shaft 110 having the driven gear 108 mounted thereon is supported at its opposite ends via bearings.

However, because the disclosed power transmitting apparatus requires relatively many (four in total) bearings for supporting the main shaft 102 and driving shaft 104 and a housing large enough for receiving and retaining such four bearings, the size and weight of the apparatus are undesirably increased.

The driving apparatus disclosed in the SHO 55-22529 publication is generally shown in FIG. 8. Motor output shaft 202 of traction motor 200 has opposite ends supported via bearings 204 (only one shown in FIG. 8). One of the ends of the motor output shaft 202 has a tip inserted in gear case 206 and mounting thereon reduction drive gear 208. The sealing between the gear case 206 and motor housing 210 is provided by use of an oil seal adjacent to the bearing 204.

However, because the gear case 206 and motor housing 210 are sealed from each other only by the oil seal, the disclosed driving apparatus has the problem that the sealing reliability would decrease as the oil seal deteriorates in function.

It is therefore an object of the present invention to provide a power transmitting apparatus for use in a vehicle which can reduce the number of necessary bearings so as to minimize the size and weight of the apparatus and can also maintain a high sealing reliability irrespective of functional deterioration of an oil seal between the gear case and motor housing.

SUMMARY OF THE INVENTION

In order to accomplish the above-mentioned object, the present invention provides a power transmitting apparatus, for use in a vehicle, which includes a motor shaft of a vehicle-driving motor, an input shaft operatively connecting with the motor shaft, output shafts disposed in parallel with the input shaft to be connected with driven wheels of the vehicle, and a transmitting mechanism for transmitting driving power from the input shaft to the output shafts, and which is characterized in that it comprises a pair of motor shaft bearings supporting the opposite end portions of the motor shaft, one of the end portions of the motor shaft supporting one of the end portions of the input shaft in such a manner that the motor shaft can transmit driving power from the motor to the input shaft, and a bearing supporting the other end portion of the input shaft, the transmitting mechanism being disposed adjacent to the other end portion of the input shaft remotely from the section where the one end portion of the input shaft is supported by the motor shaft.

Preferably, the motor shaft has one or more spline grooves formed in an inner peripheral surface thereof and the input shaft has one or more spline keys formed on an outer peripheral surface thereof, and the motor shaft and input shaft are connected with each other by spline joint between the spline keys of the input shaft and the spline grooves of the motor shaft.

Alternatively, each of the motor shaft and input shaft may have one or more spline keys formed on an outer peripheral surface thereof, and the motor shaft and input shaft may be connected with each other via a separate coupling having spline grooves that engage the respective spline keys of the motor shaft and input shaft.

Preferably, the end portion of the motor shaft connected with the input shaft is supported by a sealed bearing and also sealed by an oil seal provided outwardly of the sealed bearing, and an opening is formed between the oil seal and sealed bearing in communication with the atmosphere. Preferably, the input shaft has an oil passage formed therein to feed lubricating oil to the section where the motor shaft and input shaft are connected with each other by the spline joint.

Because one of the motor shaft end portions supports one of the opposite end portions of the input shaft in such a manner to transmit driving power from the driving motor to the input shaft, it is possible to eliminate one separate bearing that was conventionally needed to support the one end portion of the input shaft of the speed-reducing mechanism, and hence the number of the necessary bearings can be reduced to "three" as compared to "four" in the prior art apparatus.

In addition, because the transmitting gearing is located remote from the section where the input shaft is supported by the motor shaft, the radial load by the gearing will not significantly affect the supporting section, which achieves enhanced durability of the supporting section.

Further, because of the arrangement that the motor shaft and input shaft are coupled with each other by engaging the spline keys of the input shaft with the corresponding spline grooves of the motor shaft, the input shaft is advantageously allowed to slightly move in the axial and radial directions. This movability of the input shaft effectively accommodates an alignment error that may occur when the motor and speed-reducing mechanism are assembled together.

Where the motor shaft and input shaft are connected with each other via a separate coupling, spline grooves can be formed in the coupling which is relatively easy to process or machine owing to its small size, and spline keys can be formed on the motor shaft and input shaft which are relatively difficult to process due to their elongate configuration.

Moreover, in the power transmitting apparatus of the present invention, the end portion of the motor shaft connected with the input shaft is preferably double-sealed by the sealed bearing and oil seal, thus achieving enhanced sealing reliability.

In addition, because of the provision of the opening communicating with the atmosphere, oil accidentally leaked through the oil seal can be directed outside the vehicle, so that the sealing reliability in and around the motor can be enhanced even further. In this case, it is also possible for the user to readily identify functional deterioration of the oil seal, just by visually detecting the oil leaked out through the opening.

The power transmitting apparatus of the invention is also characterized by the provision of the oil passage in the input shaft, which allows the oil in the speed-reducing mechanism to be fed to the spline joint section for lubrication of the same. This effectively enhances the durability of the spline joint section.

BRIEF DESCRIPTION OF THE ACCOMPANYING DRAWINGS

The above and other objects, advantages and features of the present invention will become apparent from the following detailed description of the preferred embodiments when read in conjunction with the accompanying drawings, in which.

DETAILED DESCRIPTION OF THE PREFERRED EMBODIMENTS

First of all, with reference to FIGS. 1 to 4, a description will be made about a power transmitting apparatus according to a first embodiment of the present invention, which is used in a transportation vehicle.

Figure 1:
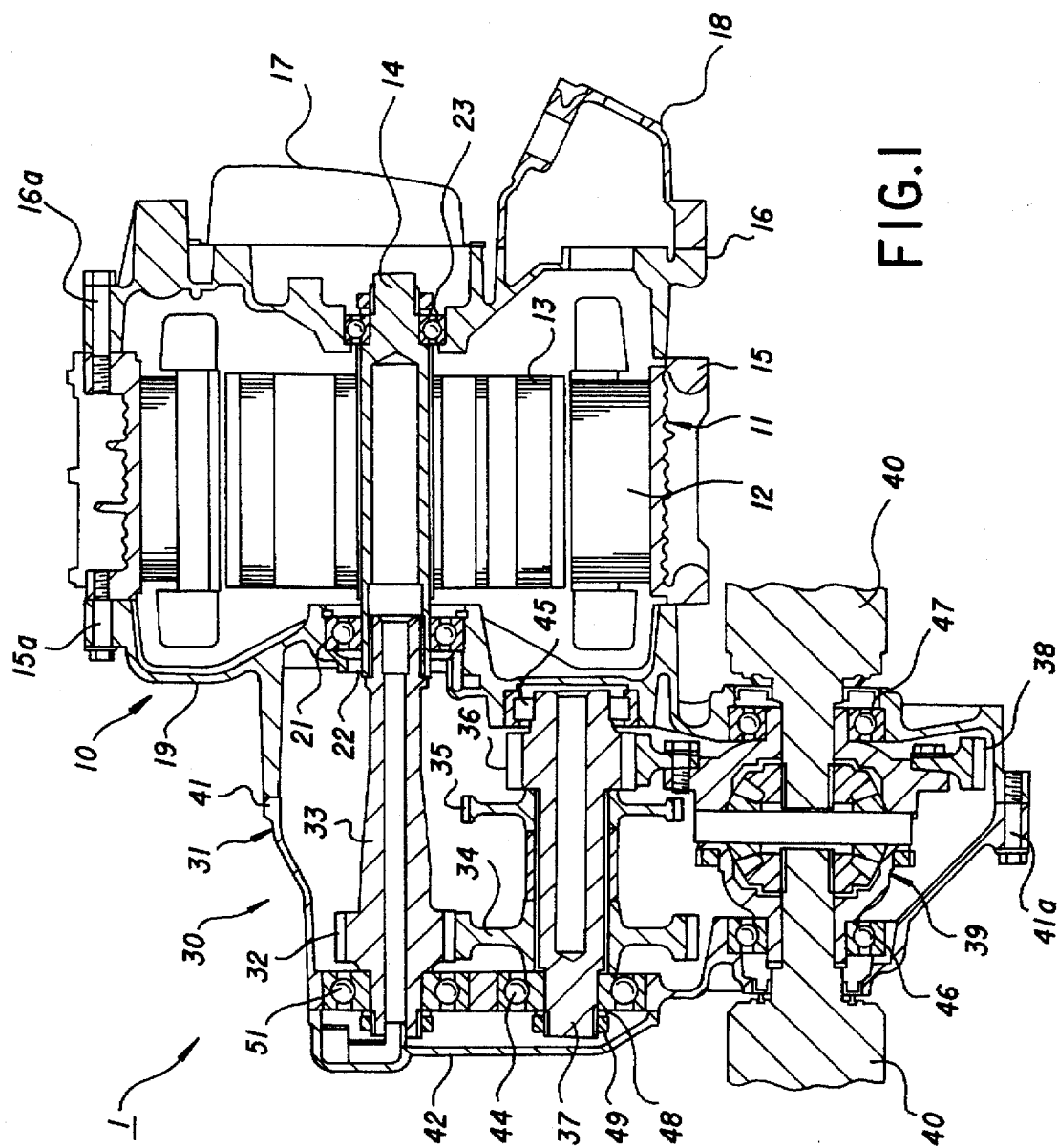
FIG. 1 is a sectional view of a power transmitting apparatus according to a first embodiment of the present invention.

In FIG. 1, the power transmitting apparatus 1 according to the first embodiment includes vehicle driving motor 10 and speed-reducing mechanism 30. The vehicle driving motor 10 includes motor housing 11, a plurality of stators 12 accommodated in the housing 11, and rotor 13 interacting with the stators 12. Motor shaft 14 is mounted centrally within the rotor 13.

The motor housing 11 is composed of housing body 15, motor cover 16 secured to the rear end of the housing body 15 by means of bolt 16a, bearing cover 17 and terminal cover 18 attached to the motor cover 16, and first gear housing 19 secured to the fore end of the housing body 15 by means of bolt 15a.

The speed-reducing mechanism 30 includes an input shaft 33 operatively connecting with the motor shaft 14 of the vehicle driving motor 10, and an output shafts 40 disposed in parallel with the input shaft 33 and connected to driven wheels (not shown) of the vehicle. The speed-reducing mechanism 30 further includes first small-size gear 32, first large-size gear 34, second small-size gear 36 and second large-size gear 38 which together constitute a power transmitting mechanism between the input and output shafts 33 and 40, and differential mechanism 39. The power transmitting mechanism between the input and output shafts 33 and 40 may be constructed of a chain or belt mechanism rather than the meshing gears 32, 34, 36 and 38.

More specifically, the speed-reducing mechanism 30 is comprised of: gear housing 31; the input shaft 33 having the first small-size gear 32 formed thereon as a transmitting member; countershaft 37 disposed in parallel with the input shaft 33 and having the first large-size gear 34, gear 35 to be used for parking and second small-size gear 36 mounted thereon; the differential mechanism (actuating mechanism) having the second large-size gear 38 mounted thereon; and the output shafts 40 coupled with the differential mechanism 39 in parallel relation to the input shaft 33 and also connected the driven wheels. The first small-size gear 32 on the input shaft 33 is in mesh with the first large-size gear 34 on the countershaft 37, and the second small-size gear 36 on the countershaft 34 is in mesh with the second large-size gear 38 of the differential mechanism 39. Thus, the speed-reducing mechanism 30 provides a speed reducer which has no speed changing mechanism and hence is fixed at a single speed (low speed).

The gear housing 31, which is provided for enclosing the input shaft 33, countershaft 37 and differential mechanism 39, comprises the first gear housing 19, second gear housing 41 secured via bolt 41a to cover an opening formed in the left side (as viewed in FIG. 1) of the first gear housing 19, and gear cover 42 secured via bolt to cover the fore end of the second gear housing 41. The first gear housing 19 functions as a part of the motor housing 11 covering the motor and also as a part of the gear housing 31 covering the power transmitting mechanism.

Reference numerals 44 and 45 denote bearings for supporting the opposite ends of the countershaft 37, and 46 and 47 denote bearings for supporting the opposite ends of the differential mechanism 39, with 48 and 49 denoting a washer and a nut, respectively.

Figure 2:
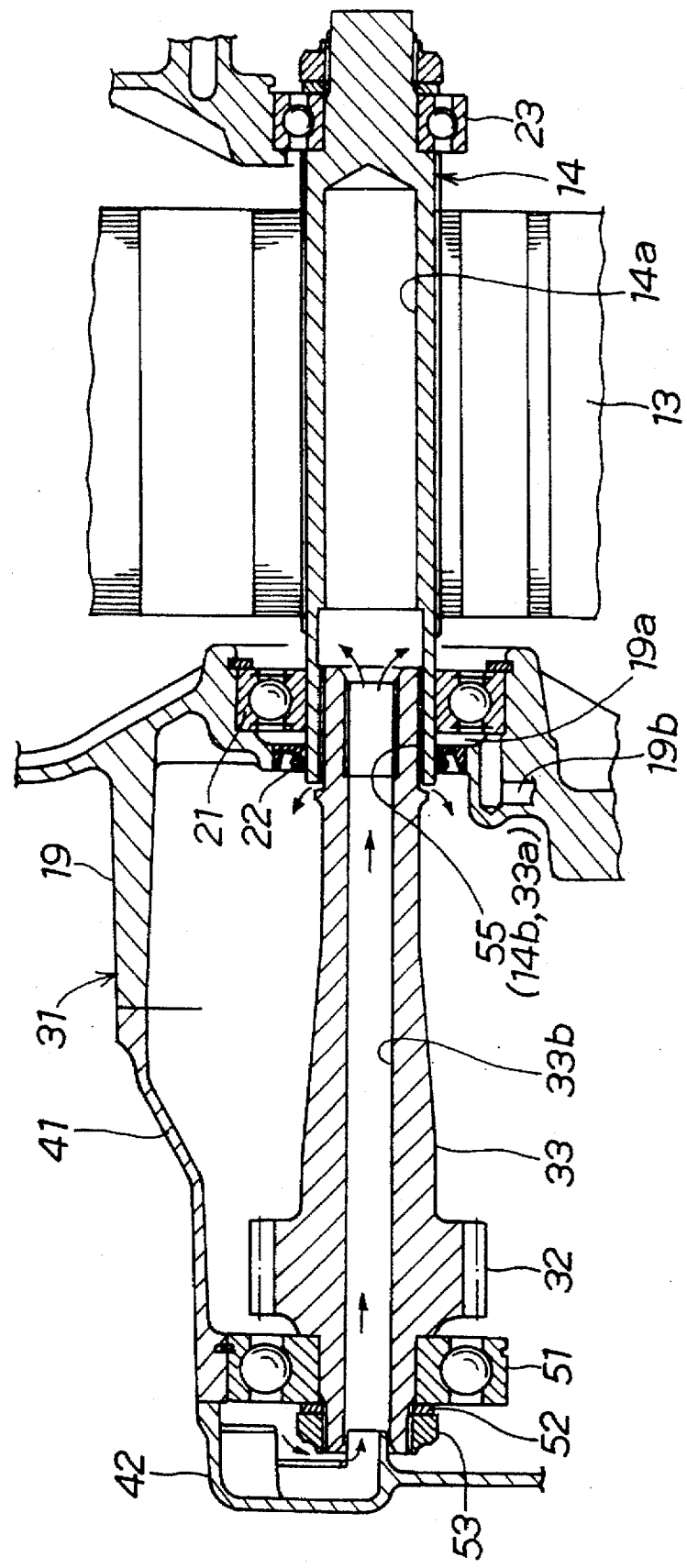
FIG. 2 is a sectional view showing in detail a connection between the motor shaft and input shaft in the first embodiment.

FIG. 2 is an enlarged sectional view showing in detail a connection between the motor shaft 14 and input shaft 33 in the power transmitting apparatus of FIG. 1. As shown, the motor shaft 14 has a fore end portion (i.e., end portion connecting with the input shaft 33) partially inserted in the gear housing 31 through the wall of the first gear housing 19. The fore end portion of the motor shaft 14 is double-sealed by being supported by a sealed motor shaft bearing 21 with a sealing structure interposed between its inner and outer sleeves and being additionally sealed by an oil seal 22 provided outwardly of the bearing 21 thus achieving enhanced sealing reliability.

The first gear housing 19 has an opening 19a between the sealed bearing 21 and oil seal 22, which is in communication with the atmosphere via an oil exhaust passage 19b. This arrangement allows oil accidentally leaked through the oil seal 22 to be directed outside the vehicle, thereby even further enhancing the sealing reliability in and around the motor. It is also possible for the user to readily identify functional deterioration of the oil seal 22, by visually detecting the oil leaked out through the opening 19a and exhaust passage 19b.

The rear end portion of the motor shaft 14 is supported by another motor shaft bearing 23. The motor shaft 14 also has an axial elongate bore 14a which is open at the fore end thereof (i.e., toward the input shaft 33), and one or more spline grooves 14b are formed in the inner peripheral surface of the fore end portion of the bored motor shaft 14. The input shaft 33 has one or more spline keys 33a on the outer peripheral surface of the rear end portion (i.e., end portion connecting to the motor shaft 14).

The spline keys 33a of the input shaft 33 fit in the respective spline grooves 14b of the motor shaft 14 to operatively couple together the motor shaft 14 and the input shaft 33. Thus, the input shaft 33 is supported at the rear end portion by the fore end portion of the motor shaft 14 in such a manner that the motor shaft 14 can transmit driving power from the motor to the input shaft 33. Spline joint section 55 comprised of the spline grooves and keys 14b and 33a is supported by the sealed bearing 21. The other or fore end portion of the input shaft 33 remote from the motor shaft 14 is supported by another bearing 51. Reference numerals 52 and 53 denote a washer and a nut, respectively.

Because of the above-mentioned construction where the rear end portion of the input shaft 33 is supported by the fore end portion of the motor shaft 14, it is possible to eliminate one separate bearing that was conventionally needed for supporting the rear end portion of the input shaft 33, and the total number of the bearings required for supporting the motor shaft 14 and input shaft 33 can be reduced to three (i.e., bearings 21, 23 and 51) as compared to "four" in the prior art apparatus.

The input shaft 33 has the first small-size gear 32 integrally formed thereon at a location adjacent to the bearing 51 mounted on the fore end portion thereof remotely from the spline joint section 55 where its rear end portion is supported by the fore end portion of the motor shaft 14. Because the first small-size gear 32 is located remote from the spline joint section 55, the radial load by the gears will not significantly affect the spline joint section 55, and this substantially increases the durability of the spline joint section 55 through which is transmitted driving torque or power to the input shaft 33.

In the spline joint section 55, the input shaft 33 is movable slightly in the axial and radial directions, and this movability of the input shaft 33 effectively accommodates an alignment error that may occur when the motor 10 and speed-reducing mechanism 30 (see FIG. 1) are assembled together.

An oil passage 33b is formed centrally in the input shaft 33 and extends axially therethrough. Via the oil passage 33b, the oil in the speed-reducing mechanism 30 (i.e., within the gear housing 31) is permitted to flow to the spline joint section 55 in the arrow direction in FIG. 2 and readily lubricate the spline joint section 55. This arrangement enhances the durability of the spline joint section 55.

Now, with reference to FIGS. 3 and 4, a description will be made about exemplary procedures for assembling the power transmitting apparatus of the above-mentioned construction. Specifically, FIGS. 3A to 3C are explanatory of the former half of the procedures for assembling the power transmitting apparatus of the first embodiment and FIG. 4 is a view explanatory of the latter half of the assembling procedures.

Figure 3A:
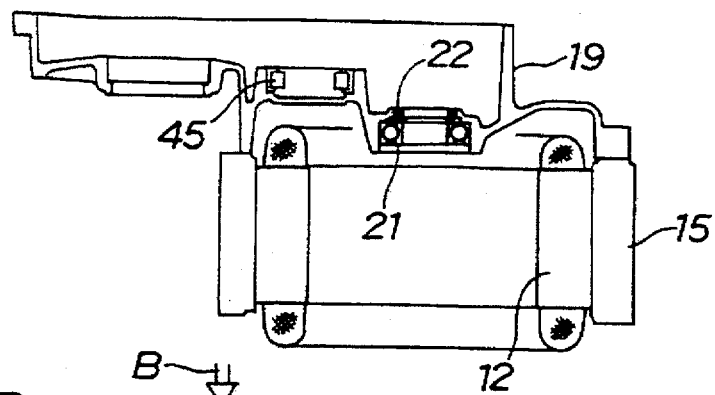
FIGS. 3A to 3C are views explanatory of the former half of exemplary procedures for assembling the power transmitting apparatus according to the first embodiment.
Figure 4:
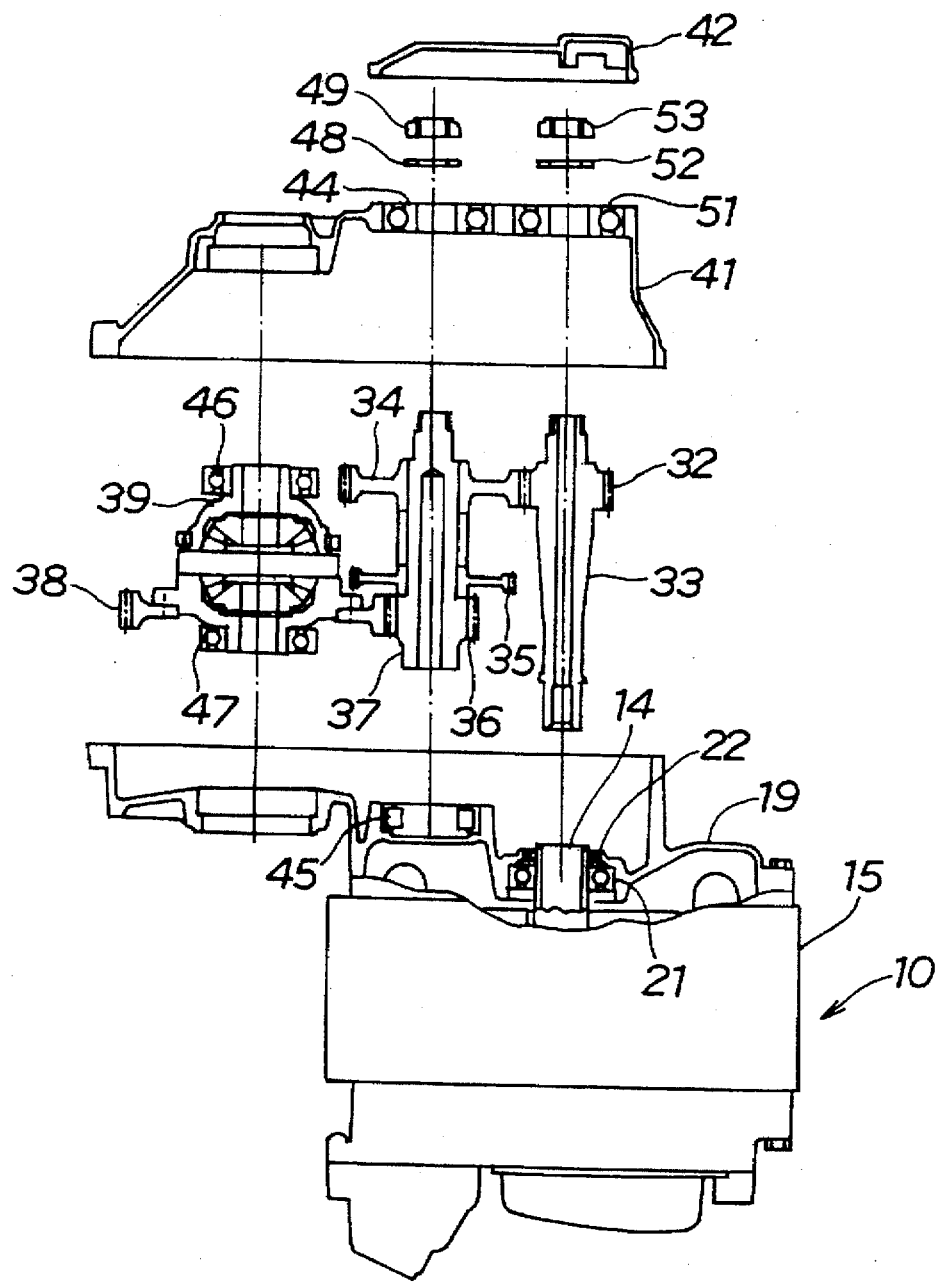
FIG. 4 is a view explanatory of the latter half of the procedures for assembling the power transmitting apparatus.

As shown in FIG. 3A, the bearings 21 and 45 and oil seal 22 are first attached to the first gear housing 19, and then the gear housing 19 is secured by the bolt 15a to the housing body 15 having the starors 12 fixedly retained therein.

Figure 3B:
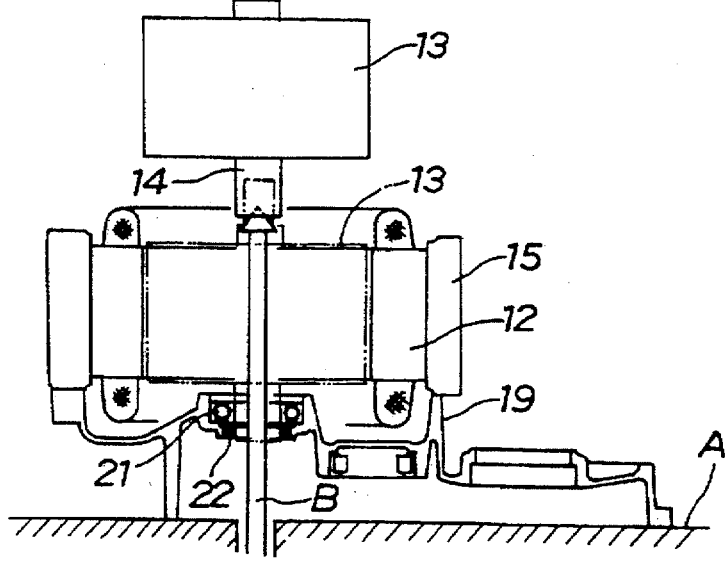

After that, as shown in FIG. 3B, the assembled housing body 15 and first gear housing 19 are turned upside down to be placed on assembling table A. Then, the rotor 13 is built into the housing body 15 while the motor shaft 14 is held above the body 15 by means of a pair of jigs B, in such a manner that the fore end (lower end in FIG. 3B) is fitted with the bearing 21 and oil seal 22. The reason why the rotor 13 is built into the housing body 15 while the motor shaft 14 is held above the body 15 is that because of the present of magnets on the rotor 13, the rotor 13 can not be properly built into the housing body 15 without the motor shaft 14 being held sufficiently away from the body 15.

Figure 3C:
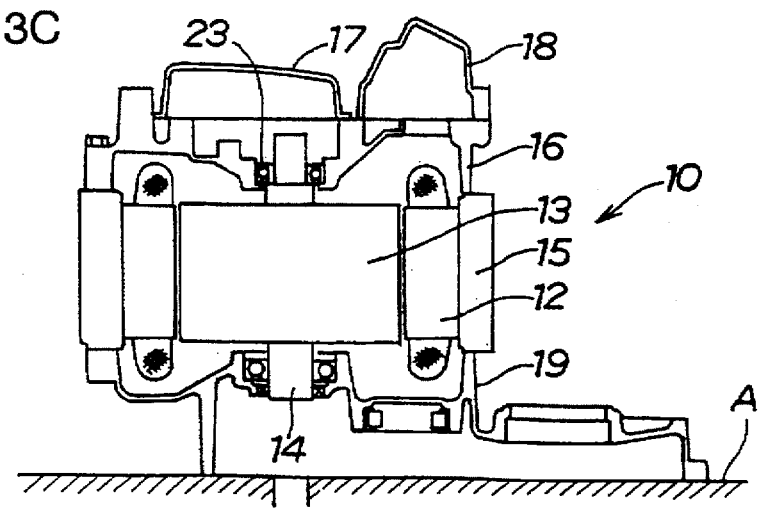

After that, as shown in FIG. 3C, the motor cover 16 is bolted to the housing body 15, the bearing 23 is mounted on the rear end (upper end in FIG. 3C) of the motor shaft 14, and then the bearing cover 17 and terminal cover 18 are bolted in place. With these procedures, assembly of the motor 10 is completed.

Next, as shown in FIG. 4, after the motor 10 is again turned upside down to be brought back to the initial orientation of FIG. 3A, the input shaft 33 is coupled by engaging the rear end (lower end in FIG. 4) portion of the input shaft 33 with the fore end (upper end in FIG. 4) portion of the motor shaft 14, the countershaft 37 is threaded into the bearing 45, and then one end of the differential mechanism 39 with the bearings 46 and 47 received therein is bolted to the gear cover 42. Also, after the second gear housing 41 is bolted to the first gear housing 19 with the bearings 44, 51, washers 48, 52 and nuts 49, 53 mounted in place, the second gear housing 41 is bolted to the gear cover 42.

With the above-described procedures, assembly of the entire power transmitting apparatus is completed. It should be noted that the procedures for assembling the power transmitting apparatus described above in relation to FIGS. 3 and 4 are only for illustrative purposes, and any other assembling procedures may be employed.

Now, a second embodiment of the present invention will be described below with reference to FIGS. 5 and 6, where the same components as in the first embodiment are denoted by the same reference numerals and will not be described in detail here to avoid unnecessary duplication.

Figure 5:
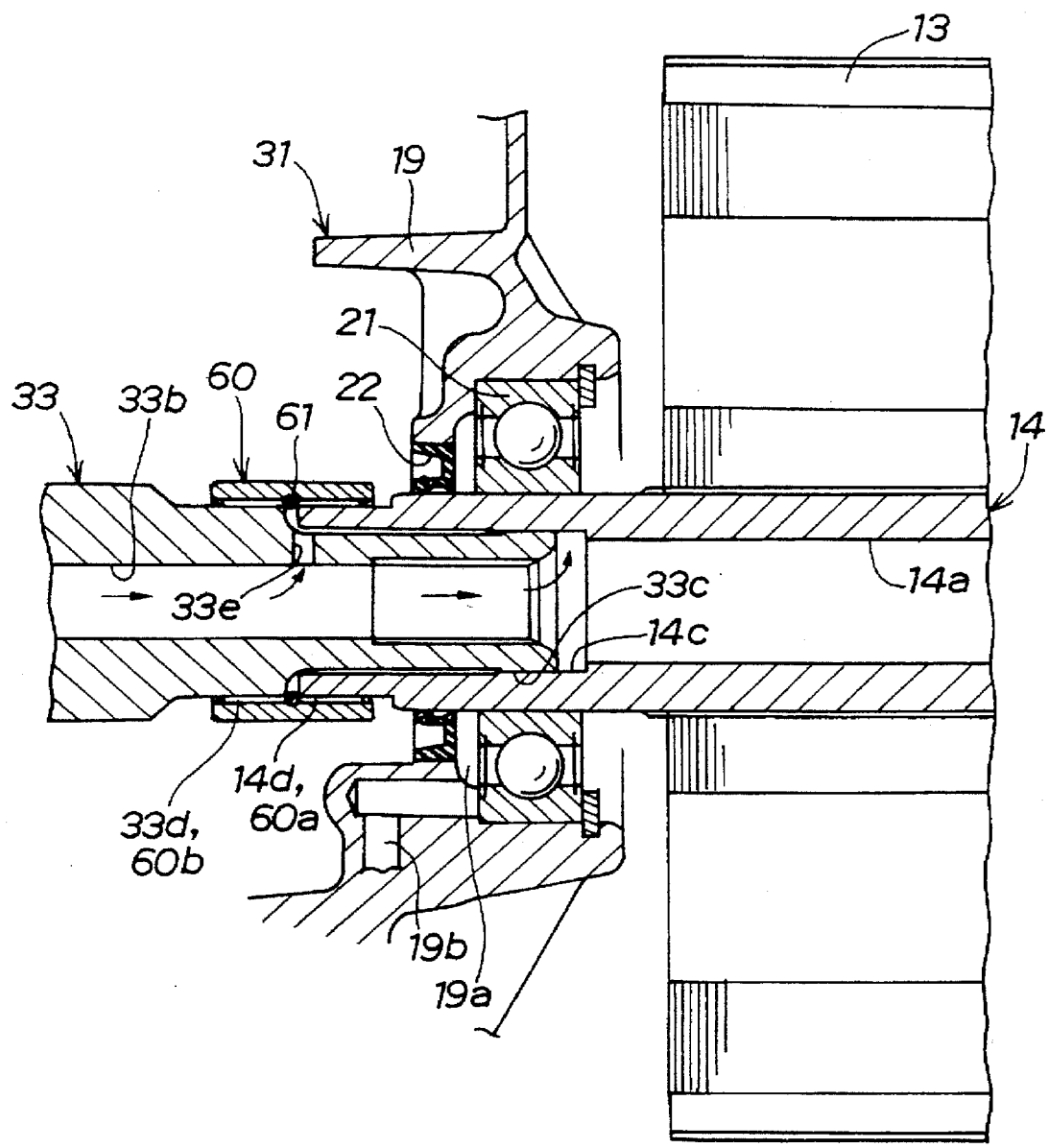
FIG. 5 is a sectional view showing a connection between the motor shaft and input shaft according to a second embodiment of the present invention.

FIG. 5 is a sectional view showing a connection between the motor shaft 14 and input shaft 33 according to the second embodiment of the present invention. In this embodiment, the motor shaft 144 is designed such that the length of its fore end portion (i.e., end portion connecting with the input shaft 33) extending into the gear housing 31 is greater than that in the first embodiment shown in FIG. 2. Also, the position where the motor shaft 14 supports the one or rear end portion of the input shaft 33 is different from the position where the motor shaft 14 is coupled with the input shaft 33.

The motor shaft 14 has supporting bore 14c axially formed in the fore end portion thereof, and the input shaft 33 has an extended rear end portion that fits into the supporting bore 14 of the motor shaft 14, so that the input shaft 33 is supported at its fore end portion by the supporting bore 144 of the motor shaft 14. The section where the input shaft 33 is supported by the supporting bore 14 in the fore end portion of the motor shaft 14 is carried by the sealed bearing 21 fixedly threaded on the fore end portion of the motor shaft 14.

Reference numeral 33e denotes a passageway for directing lubricating oil from the oil passage 33b to a spline joint section within a coupling 60 which will be described in relation to FIG. 6.

Figure 6:
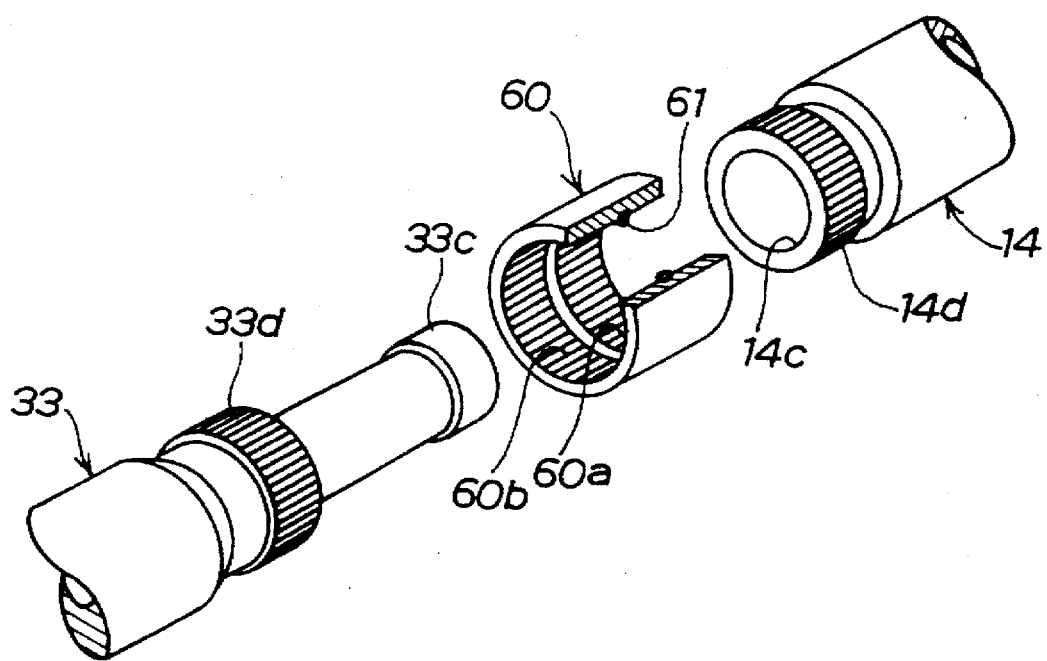
FIG. 6 is an exploded perspective view of the connection between the motor shaft and input shaft of FIG. 5.
Figure 7:
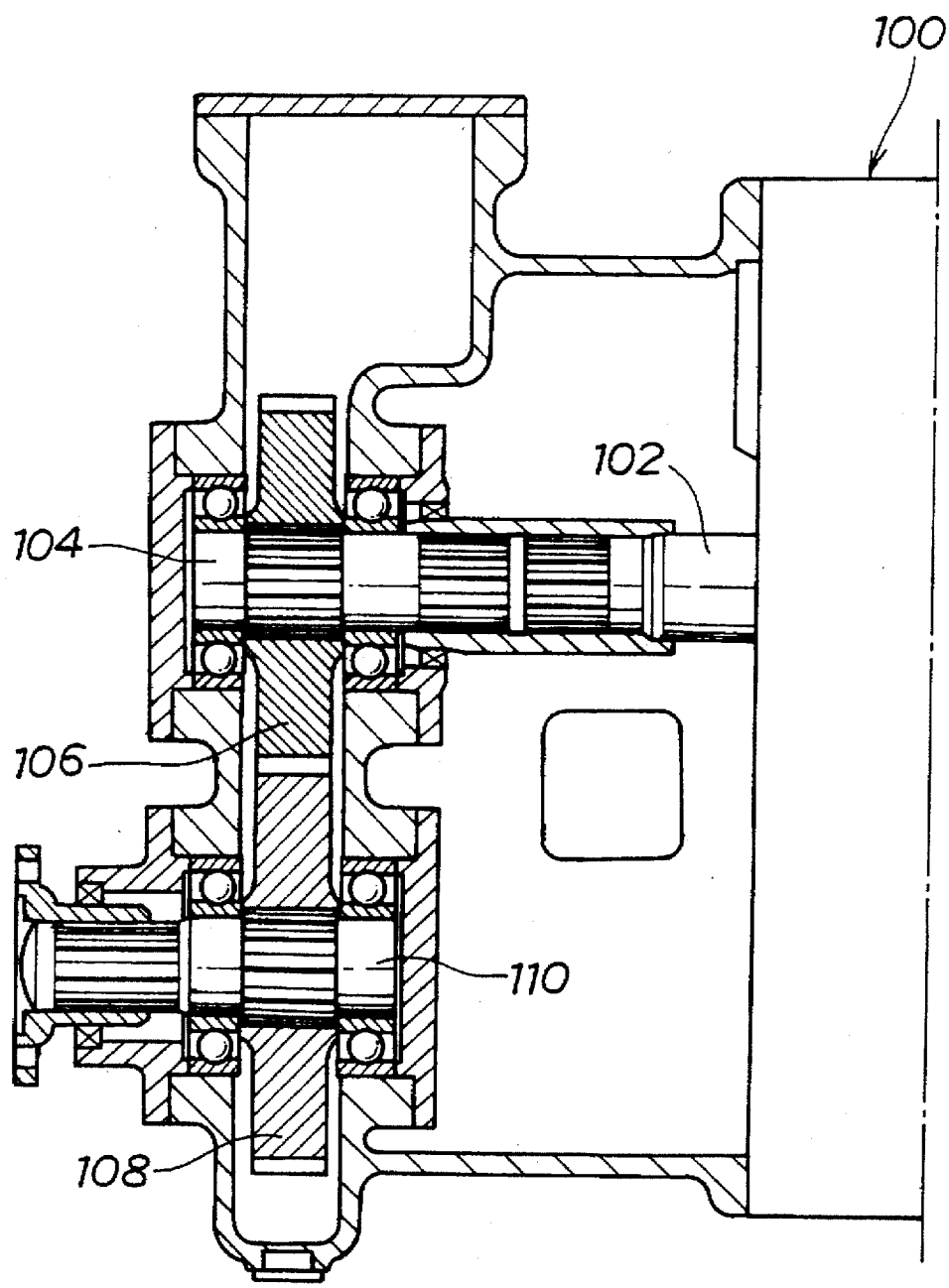
FIG. 7 is a sectional view of a connection between the vehicle-driving motor and a transmission in a prior art power transmitting apparatus.
Figure 8:
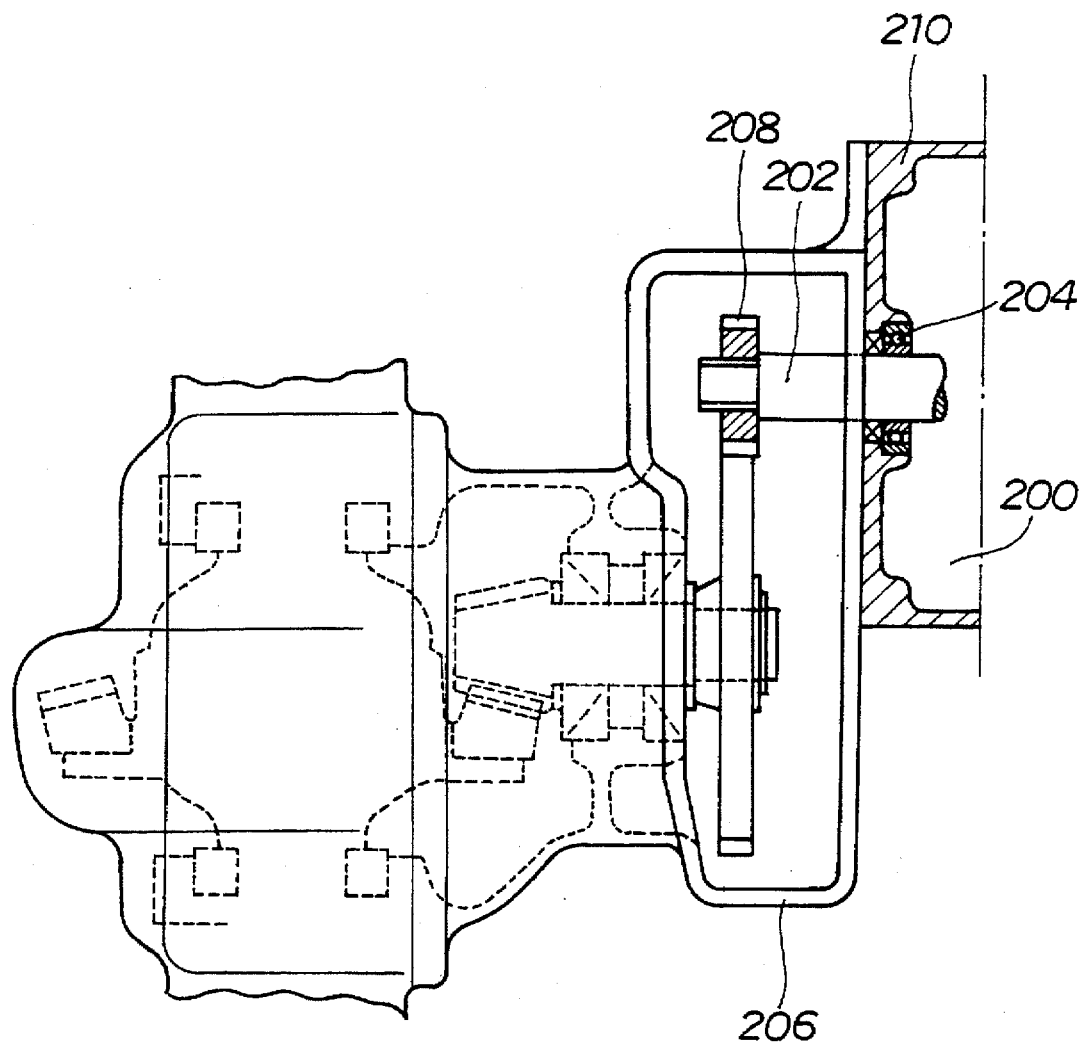
FIG. 8 is a view showing a prior art driving apparatus with the gear case cover removed.

FIG. 6 is an exploded perspective view showing in detail the connection between the motor shaft 14 and the input shaft 33 of FIG. 5. One or more spline keys 14d are formed on the outer peripheral surface of the fore end portion of the bored motor shaft 14, and one or more spline keys 33d are formed on the outer peripheral surface of the input shaft 33 adjacent to the rear end thereof. The motor shaft 14 and input shaft 33 are coupled with each other via the coupling 60 with the spline keys 14d and 33d of the shafts 14 and 33 engaging respective spline grooves 60a and 60b formed in the inner peripheral surface of the coupling 60. A snap ring (retaining ring) 61 is fitted in the inner peripheral surface of the coupling 60 centrally in the axial direction thereof. The snap ring 60 retains the coupling 60 against axial displacement relative to the shafts 14 and 33, to thereby prevent accidental decoupling of the shafts 14 and 33.

According to the second embodiment, the spline grooves 60a and 60b can be formed in the coupling 60 which is relatively easy to process or machine owing to its small size, the spline keys 14d and 33d can be formed on the motor shaft 14 and input shaft 33 which are relatively difficult to process due to their elongate configuration.

In summary, in the power transmitting apparatus according to the present invention, the opposite end portions of the motor shaft 14 are supported by a pair of motor shaft bearings 21 and 23, and one of the motor shaft end portions supports one of the opposite end portions of the input shaft 33 in such a manner that the motor shaft 14 can transmit driving power from the driving motor to the input shaft 33. Further, the other end portion of the input shaft 33 is supported by another bearing 51, and the power transmitting mechanism for transmitting driving power from the motor shaft 14 to the input shaft 33 is disposed adjacent to the other end portion of the input shaft 33. This arrangement can eliminate or make unnecessary one separate bearing that was conventionally needed to support the one end portion of the input shaft of the speed-reducing mechanism, and hence reduce the number of the bearings to "three", thus reducing the total number of component parts necessary for constructing the apparatus. The arrangement can also substantially reduce the axial length of the housing necessary for receiving and retaining the bearings. Consequently, the size and weight of the power transmitting apparatus can be reduced to a substantial degree. In addition, because the transmitting gearing is located remote from the section where the input shaft 33 is supported by the motor shaft 14, much of the radial load caused by the gearing will not be applied to the supporting section, which achieves enhanced durability of the supporting section.

Further, in the first embodiment where the motor shaft 14 and input shaft 33 are coupled with each other by fitting the spline keys 33a of the input shaft 33 into the corresponding spline grooves 14b of the motor shaft 14, the input shaft 33 is allowed to slightly move in the axial and radial directions. This movability of the input shaft 33 accommodates an alignment error that may occur when the motor 10 and speed-reducing mechanism 30 are assembled together.

In the second embodiment where the motor shaft 14 and input shaft 33 are coupled with each other via the coupling 60 having spline grooves 60a and 60b in meshing engagement with the respective spline keys of the motor shaft 14 and input shaft 33, because the spline grooves are formed in the coupling 60 of relatively small size, the spline keys 14d and 33d can be formed on the elongate motor shaft 14 and input shaft 33. In this embodiment as well, the input shaft 33 is allowed, via the spline joint, to slightly move in the axial and radial directions. This movability of the input shaft 33 accommodates an alignment error that may occur when the motor 10 and speed-reducing mechanism 30 are assembled together.

Moreover, in the power transmitting apparatus of the present invention, the end portion of the motor shaft 14 to be coupled with the input shaft 33 is double-sealed by being supported by the sealed bearing 21 and being also sealed by the oil seal 22, thus achieving enhanced sealing reliability. In addition, because of the provision of the opening 19a communicating with the atmosphere, oil accidentally leaked through the oil seal 22 is allowed to be directed outside the vehicle, so that the sealing reliability in and around the motor 10 can be enhanced. It is also possible for the user to readily identify functional deterioration of the oil seal 22, by detecting the oil flown out through the opening 19a.

The power transmitting apparatus of the invention is also characterized by the provision of the oil passage 33b in the input shaft 33, which allows the oil in the speed-reducing mechanism 30 to be flown to the spline joint section for facilitated lubrication of the same. This effectively enhances the durability of the spline joint section.

What is claimed is:

1. A power transmitting apparatus, for use in a vehicle, including a motor shaft of a vehicle-driving motor, an input shaft operatively connecting with the motor shaft, output shafts disposed in parallel with the input shaft and adapted to be connected with driven wheels of the vehicle, and a transmitting mechanism for transmitting driving power from the input shaft to the output shaft, said apparatus comprising:

a pair of motor shaft bearings supporting opposite end portions of said motor shaft, one of the end portions of said motor shaft being sole support for one of opposite end portions of said input shaft in such a manner that said motor shaft can transmit driving power from the vehicle driving motor to said input shaft; and a bearing supporting the other end portion of said input shaft, a transmitting member of said transmitting mechanism being disposed adjacent to said other end portion of said input shaft remotely from a section where the one end portion of said input shaft is supported by the one end portion of said motor shaft.

2. A power transmitting apparatus as defined in claim 1 wherein said motor shaft has one or more spline grooves formed in an inner peripheral surface thereof and said input shaft has one or more spline keys formed on an outer peripheral surface thereof, and wherein said motor shaft and input shaft are connected with each other by a spline joint between the spline keys of said input shaft and the spline grooves of said motor shaft.

3. A power transmitting apparatus as defined in claim 1 wherein each of said motor shaft and input shaft has one or more spline keys formed on an outer peripheral surface thereof, and wherein said motor shaft and input shaft are connected with each other via a coupling having spline grooves engaging the respective spline keys of said motor shaft and input shaft.

4. A power transmitting apparatus as defined in claim 1, 2 or 3, wherein one of said motor shaft bearings supporting the end portion of said motor shaft connecting with said input shaft is a sealed bearing and is also sealed by an oil seal provided outwardly of said sealed bearing, and which further comprises an opening formed between said oil seal and sealed bearing in communication with the atmosphere.

5. A power transmitting apparatus as defined in claim 2 or 3, wherein said input shaft has an oil passage formed therein to feed lubricating oil to said spline joint section.

* * * * *